United States Patent [19]
Porter

[11] 4,002,891
[45] Jan. 11, 1977

[54] MIXER CONTROL SYSTEM

[75] Inventor: John Paul Porter, Cuyahoga Falls, Ohio

[73] Assignee: The B. F. Goodrich Company, Akron, Ohio

[22] Filed: Aug. 13, 1975

[21] Appl. No.: 604,241

[52] U.S. Cl. .................. 235/151.12; 235/151.31; 259/185; 259/192; 259/DIG. 19
[51] Int. Cl.² ...................... B29B 1/04; B29H 1/10
[58] Field of Search ............... 235/151.12, 151.13, 235/151.3, 151.31; 259/154, 191, 192, DIG. 19

[56] References Cited
UNITED STATES PATENTS

| | | | |
|---|---|---|---|
| 3,237,241 | 3/1966 | Gagliardi | 259/192 |
| 3,456,599 | 7/1969 | Baker | 259/191 |
| 3,839,628 | 10/1974 | Higgins et al. | 235/151.3 |
| 3,841,147 | 10/1974 | Coil et al. | 235/151.3 |

*Primary Examiner*—Felix D. Gruber
*Attorney, Agent, or Firm*—Harry F. Pepper, Jr.; W. A. Shira, Jr.

[57] ABSTRACT

A fluidizing mixer works a mixture of materials, such as polyvinyl chloride (PVC) resin, together with plasticizers and liquid stabilizers and the batch is then discharged at the end of a work cycle of operation. The mixer employs an electrically energized driver which drives a working member, such as a high speed mixing blade, such that electrical energy is expended as work is being performed on the material. During each work cycle of operation the amount of expended electrical energy is sensed for purposes of providing a work signal having a value in accordance with the energy being expended. A work cycle is terminated when the amount of energy being expended to work the material decreases by a given amount.

13 Claims, 4 Drawing Figures

MIXER CONTROL SYSTEM

This invention relates to the art of mixing materials and more particularly, to improved apparatus and method for obtaining more uniform mixture characteristics from batch to batch.

It is known in the art to mix polyvinyl chloride (PVC) materials in a fluidizing mixer, such as a Henschel mixer or the like. In such a mixer, a housing contains a rotating blade near its bottom. An upper door is hinged to the housing and permits entry of resin, plasticizers, liquid stabilizers and other materials. The blade rotates at a high speed to provide high sheer mixing. During an operating cycle, the mixer is initially operated only with resin in the housing and is run at a high speed until the temperature attains a level on the order of 180° F. At that point and while still running at high speed, plasticizer and liquid stabilizers are introduced to the mixer and the temperature decreases. When the batch again attains a temperature on the order of 180° F fillers, pigments, solid stabilizers and lubricants are added to the batch and the mixing continues for at least one minute. When the batch attains a temperature on the order of 220° F, the batch is discharged by means of a door at the lower end of the housing. In some applications, this discharge point may also be judged from a motor ammeter reading.

The mixing of PVC materials as described above may result in non-uniform characteristics from batch to batch, causing variations in extrusion rates. One reason for this is the difficulty of obtaining precise measurements of the batch temperature. For example, the efficiency of heat transfer into a sensor probe employed to obtain the temperature reading may be highly variable causing errors on the order of plus or minus 20° F. Moreover, the use of a motor ammeter to monitor the current being drawn by the mixer motor has not proved satisfactory since human error is involved in judging the current level and the correct level may vary depending on the type of mixture involved.

SUMMARY OF THE INVENTION

It is therefore a primary object of the present invention to provide improved control for a fluidizing mixer to achieve more uniform mixtures from batch to batch.

It is a more specific object of the present invention to provide improved control of a fluidizing mixer wherein an operating work cycle is automatically terminated as a function of the electrical power expended during the work cycle.

It is a still further and more specific object of the present invention to provide improved control of a fluidizing mixer which does not require that an operator monitor a temperature sensing probe or a motor ammeter in order to determine the proper time to terminate a mixing cycle.

The present invention contemplates the provision of a fluidizing mixer for mixing various materials, such as in mixing PVC resin, and wherein the mixer employs a working means for mechanically working the materials. Moreover, it is contemplated that an electrically energized drive mechanism serves to drive the working means in such a manner that electrical energy is expended as work is performed on the material.

In accordance with the present invention, the amount of work performed during a work cycle of operation on the material being mixed is determined as a function of the expended electrical energy and an electrical work signal is provided having a value in accordance with the expended electrical energy. The work cycle is terminated when the amount of energy expended to work the material decreases by a given amount.

In accordance with a more limited aspect of the present invention a determination is made at successive increments of time as to whether the electrical energy expended has decreased in value by the given amount.

In accordance with a still further aspect of the present invention, an electrical energy increment selection means provides a threshold signal and a comparator periodically determines whether the electrical energy expended has decreased by an amount in excess of that represented by the threshold signal.

BRIEF DESCRIPTION OF THE DRAWINGS

The foregoing and other objects and advantages of the invention will become more readily apparent from the following description of the preferred embodiment of the invention as taken in conjunction with the accompanying drawings, which are part hereof, and wherein.

DESCRIPTION OF THE PREFERRED EMBODIMENT

The preferred embodiment of the mixer control is described herein in conjunction with a fluidizing mixer for mixing PVC material. One suitable mixer is known as the Henschel mixer and is conventional in the art. Such a mixer is illustrated in FIG. 1 and will be described herein to the extent necessary to facilitate an understanding of the present invention.

Figure 1:
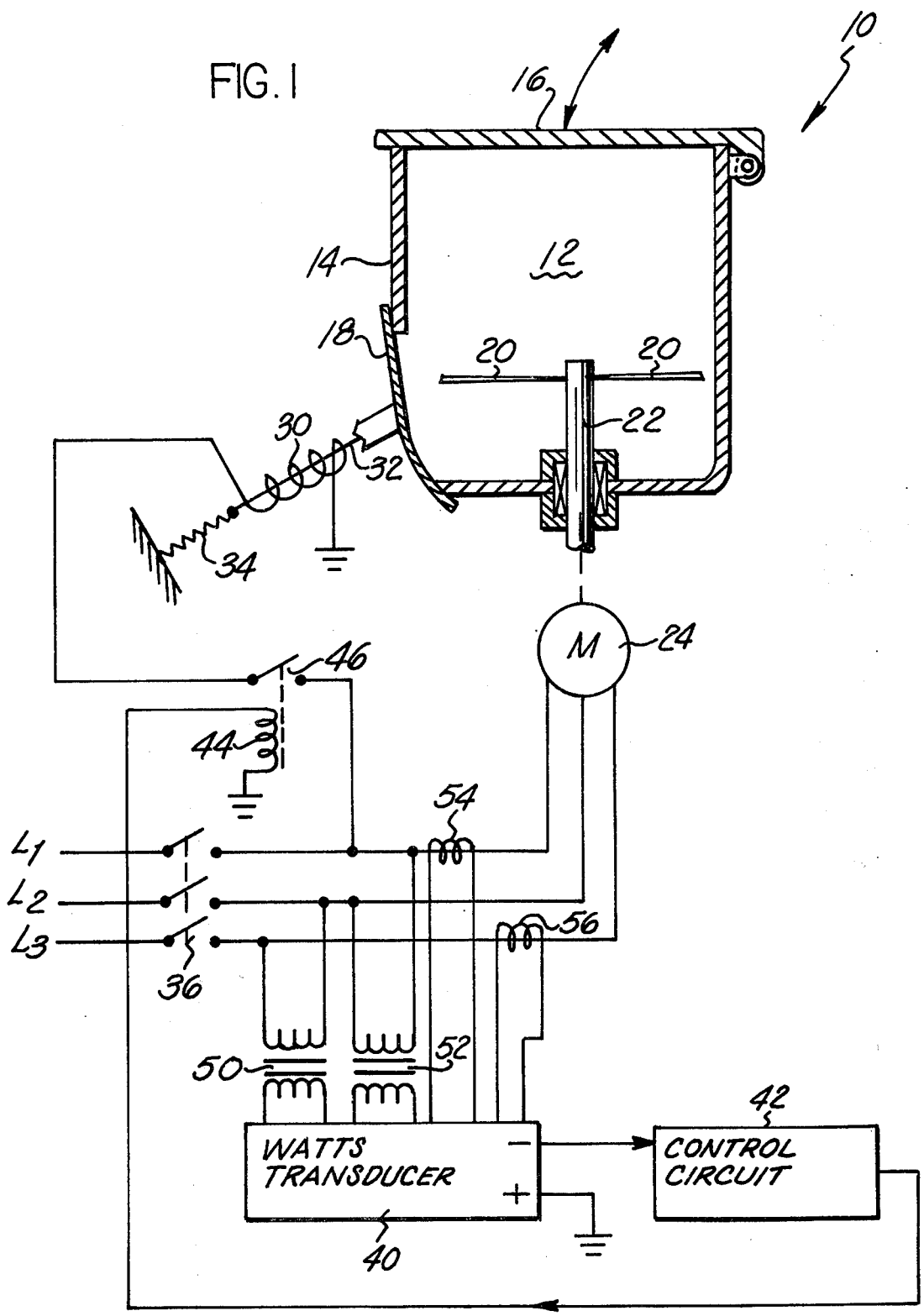
FIG. 1 is a schematic fragmentary sectional view illustrating a mixing apparatus together with the control circuitry of the present invention.

Referring now to FIG. 1 of the drawings, there is schematically illustrated, in simplified fashion, a Henschel fluidizing mixer 10 which comprises a mixing chamber 12 defined by a housing 14 having an upper door 16 suitably hinged to the walls of the housing and a lower door 18. Door 16 may be pivoted to an open position for purposes of supplying PVC resin, plasticizers and mixing aids into the work chamber 12. A pair of shear blades 20 are located within the work chamber and are mounted to a shaft 22 driven by a motor 24. The shear blades 20 are driven at a relatively high speed by the motor and serve to provide high shear mixing to ensure that every resin particle is representative of the whole formation. Its relatively rapid frictional heating provides fast cycles and uniform plasticizer absorption to eliminate fish eyes and gel particles. When a working cycle is completed, as will be described in greater detail hereinafter, door 18 is opened to permit exit of the mixed batch from the work chamber 12. For purposes of simplification, door 18 is shown as being a solenoid operated door in that a solenoid coil 30, when energized, drives a solenoid operatively connected to the door to a door open position. A spring 34 serves to hold the door in a closed position when the solenoid is not energized.

Electrical power is supplied to the motor 24 from a suitable source of three phase alternating electrical energy through power supply lines $L_1$, $L_2$, $L_3$ upon actuation of a suitable switch 36. In accordance with the present invention, the electrical power expended during each work cycle to work the material in chamber 12 is monitored to determine the correct point in the operating cycle for actuating solenoid 30 to thereby terminate a cycle of operation by dumping the contents from work chamber 12.

As will be described in greater detail with reference to FIG. 2, a watts transducer 40 is actively connected to the motor supply leads to derive a signal representative of the power consumed by motor 24. This signal is supplied to a control circuit 42 which at the proper time, as will be described hereinafter, operates the solenoid by energizing a relay coil 44. This causes relay contacts 46 to close, thereby actuating solenoid 30 to open door 18.

The watts transducer 40 may be of conventional type, as for example that sold under the trade name Halltipler by Easterline Scientific Columbus a division of the Easterline Corporation of Columbus, OH U.S.A. Transducer 40 is connected to the motor leads through voltage transformers 50 and 52 and by current transformers 54 and 56 in a known manner. The transducer provides an output signal to the control circuit 42 with the output signal having a value in accordance with the power consumed by motor 24. Typically, the output signal from transducer 40 will be at a maximum of 100 milivolts and which may be representative of 100 kws of energy consumed by the motor so that each milivolt output of the transducer becomes equivalent to one kw of energy consumed by the motor.

Figure 2:
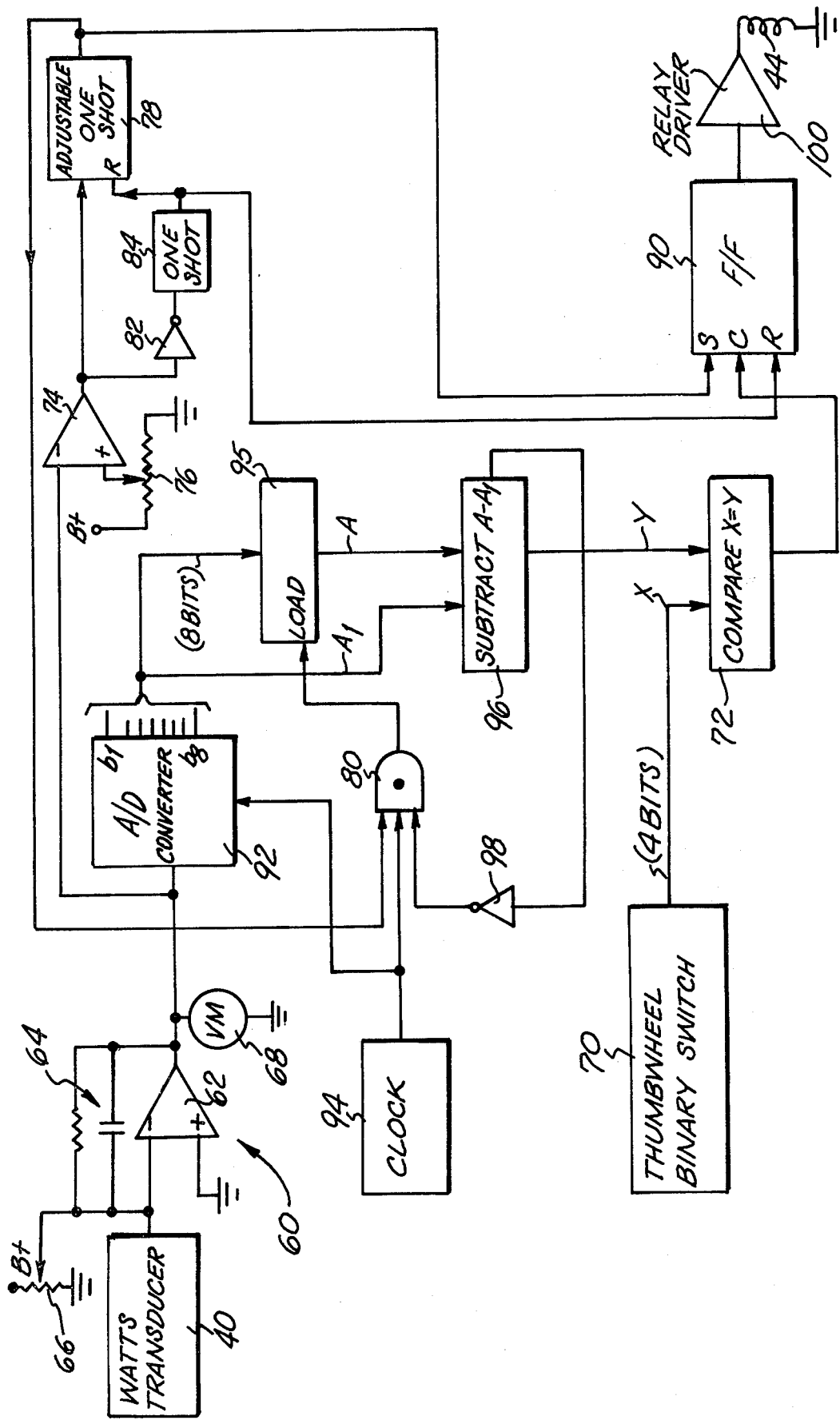
FIG. 2 is a combined schematic-block diagram illustration of the control circuitry employed in the preferred embodiment of the present invention.
Figure 3:
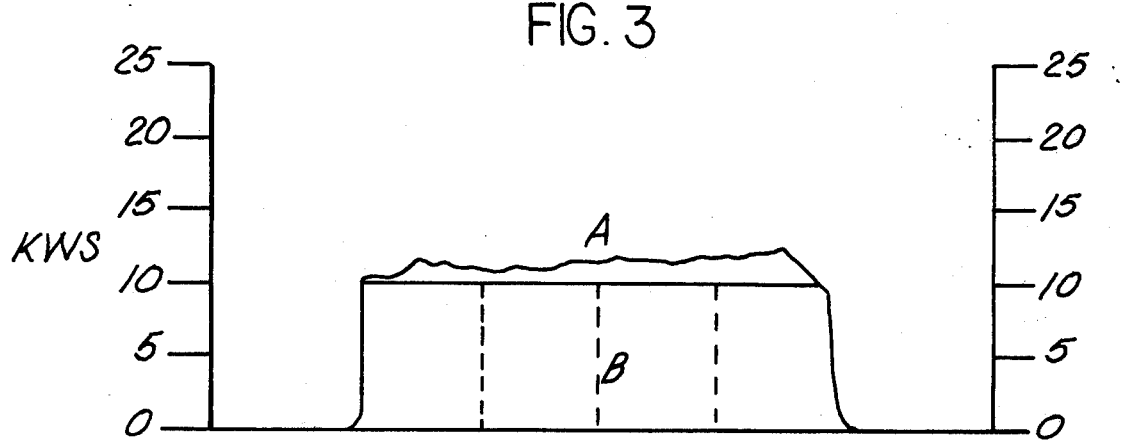
FIG. 3 is a graphical illustration showing power consumed during a work cycle; and, FIG. 4 is a graphical illustration based on FIG. 3 with portions being exaggerated for purposes of the description of the operation herein.
Figure 4:
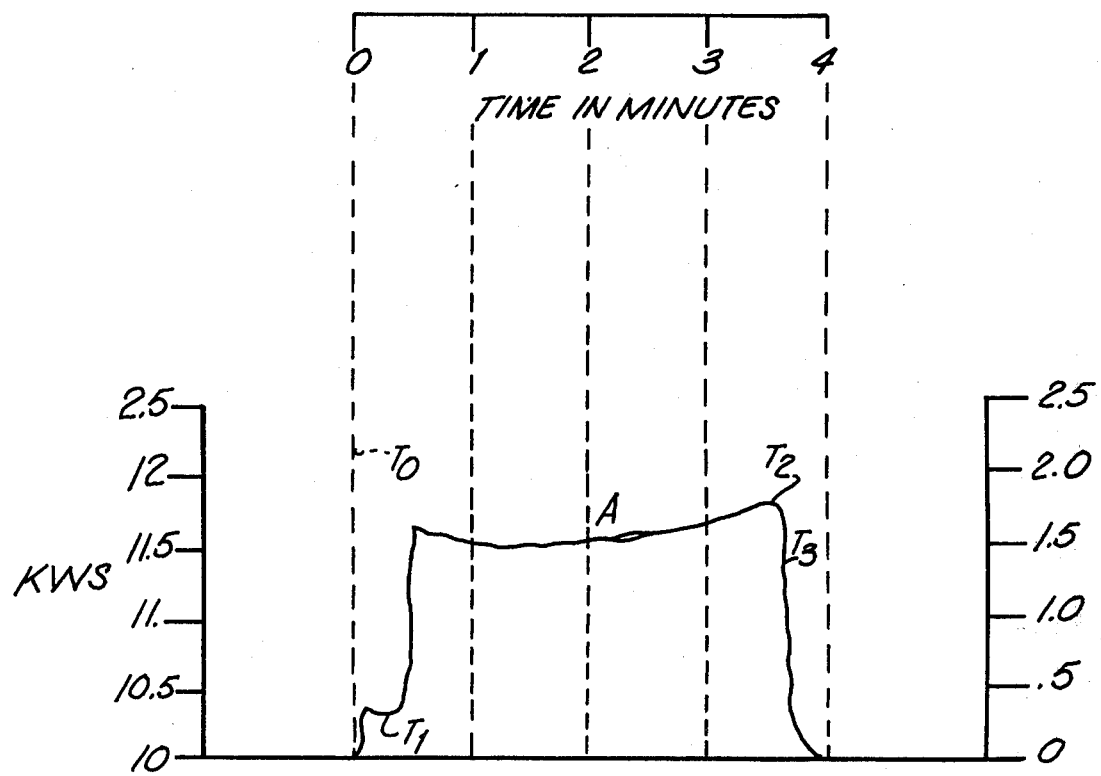

Reference is now made to FIG. 2 which illustrates the control circuit 42 in detail. The output signal from the watts transducer 40 is proportional to true power being consumed in kilowatts by the motor 24. The output of the transducer 40 is applied to a signal conditioning circuit 60 which serves to provide high frequency filtering, signal amplification, and to remove the signal component representative of a no-load condition when the motor drives blades 20 with the chamber being empty. FIG. 3 is a graphical illustration showing the kilowatts (kws) consumed by motor 24 during a typical operating cycle of approximately four minutes. This curve shows two portions, A and B. Portion B represents the power consumed to run the motor 24 when empty and portion A represents the additional power being consumed to mix a batch of material. FIG. 4 is a graphical illustration showing only portion A of FIG. 3 but with the amplitude being exploded for clarity. The signal output from the signal conditioner 60 is representative only of Portion A.

The signal conditioning circuit 60 includes an operational amplifier 62 having its non-inverting input connected to ground and a parallel RC circuit 64 connected between the inverting input and the output of the amplifier. In order to remove the no-load portion from the total signal obtained from transducer 40 an offset signal is supplied to the inverting input of amplifier 62. This is obtained from the wiper arm of a potentiometer 66 having its resistance portion connected between ground and a suitable B+ voltage supply source. In calibrating the control circuit, the mixer is run empty while adjusting the wiper arm of potentiometer 66 until the output voltage from amplifier 62 is at essentially zero volts. This may be achieved by connecting a suitable voltmeter 68 between ground and the output of amplifier 62. Amplifier 62 provides a voltage gain of 10, permitting use of a control function 10 percent of the full scale of the input.

During a mixing cycle, the power consumed by motor 24 will vary as indicated by the graphical illustrations in FIS. 3 and 4. In the example illustrated, the power required to run the mixer empty is approximately 10 consumed then kws and this is subtracted by the signal conditioning circuit 60 to provide a work signal representative of the waveform shown in FIG. 4. The PVC resin is added at time $T_0$ and the power increases by approximately 0.35 kw. The plasticizer and other ingredients are added at approximately time $T_1$ and the power required to drive blades 20 through this mixture will increase by 1.6 kw. Thereafter the power decreases slightly to approximately 1.5 kw after the elapsed time equals approximately 1.5 minutes. The power being consumed then gradually increases. The mix cycle should be terminated and the batch should be dumped when the power being consumed decreases again at approximately time $T_2$ indicative that the mix is drying. In this embodiment of the invention, it is contemplated that when the power decreases by approximately 0.1 kw at time $T_3$ the batch is dumped by energizing solenoid 30.

The control circuit 42 times some predetermined period of time such as two minutes from time $T_0$ before permitting operation of solenoid 30 to dump the contents of work chamber 12. After that point in time, the control circuit operates to determine whether the power being consumed drops by a given amount i.e. by 0.1 kw. This level is adjustable at the operator's selection by means of a suitable thumb wheel binary switch 70 which provides a four bit BCD coded signal to a comparator circuit 72. This signal is representative of a threshold, such as 0.1 kw, which if exceeded in terms of decreasing power will result in operation of solenoid 30 to dump the contents of chamber 12.

Before circuit 42 is operative to sense a decrease in power corresponding to the threshold set by switch 70, a determination is made as to whether the magnitude of the signal provided by amplifier 62 has attained a level of 10 percent of full scale. If so, an adjustable time duration, in this case 2 minutes, is timed out. This is achieved by applying the output signal from amplifier 62 to the inverting input of a comparator amplifier 74. The non-inverting input for this amplifier is set at a threshold representative of 10 percent of full scale by an adjustable wiper arm of a potentiometer 76 having its resistance portion connected between ground and a B+ voltage supply source. Once the output signal of amplifier 62 attains a level greater than this threshold level, the comparator amplifier 74 operates to provide a trigger signal to an adjustable one shot circuit 78. This circuit times an adjustable time period, in this case two minutes, and applies an enabling signal to one input of an AND gate 80. Whenever the output voltage of amplifier 62 falls below the threshold level, as set by potentiometer 76, the output of the comparator amplifier 74 will change state and this is inverted by an inverter 82 to activate a one shot circuit 84 which applies a reset signal to the adjustable one shot circuit 78, thereby removing the enabling signal applied to AND gate 80. In addition this one shot circuit will apply a reset signal to a flip flop 90 to prevent energization of relay 44, as will be described in greater detail hereinafter.

Once an enabling signal has been applied by one shot circuit 78 to the AND gate 80, the control circuit is operative to determine the point in time that the power decreases by a threshold level, as set by the thumb wheel switch 70. The analog output signal obtained from amplifier 62 is applied to an analog to digital converter 92 operated by a clock source 94. This converter is conventional in the art and, for example, may take the form of a model ADC-89 analog to digital converter provided by Datel Systems Incorporated. Such a converter is operated by a clock source and serves to convert an analog input signal into an 8 bit (bits $B_1$ through $B_8$) binary signal at the rate of 10 conversions per second. The 8 bit binary output signal represents 256 discrete levels of the analog input signal. In the example being given, the scaling represents approximately 10 watts per level.

The 8 binary signal obtained from converter 92 is applied to the input side of an 8 bit register 95 as well as to one input side of a register serving as a full adder or subtractor 96. The interval between two successive clock pulses represents one conversion interval in the example being given herein. Each clock pulse provides a load signal at the output of AND gate 80 and this is applied to the load input of register 95. In response to each clock pulse, the last previous binary word obtained from converter 92 is loaded into register 95. This binary word will then be present at the output of register 95 and will be applied to one side of subtractor 96. The clock pulse also causes a new conversion cycle and the second binary word is applied to the other side of subtractor 96. For purposes of definition the first binary word is referred to as A and the second binary word is $A_1$. Subtractor 96 operates to determine whether the new word is representative of a decrease in power and, hence, subtracts the second word $A_1$ from the previous word A. When this occurs the subtractor 96 provides an output signal which is inverted by inverter 98 and disables AND gate 80 to prevent further load pulses from being applied to register 94. Consequently then, register 94 continues to store binary word A. This should be indicative of essentially the peak power reading at approximately time $T_2$ in FIG. 4. As clock pulses are still applied to converter 92, its output will incrementally provide new binary words $A_2, A_3 \ldots A_N$. The subtractor 96 will incrementally provide a subtraction of $A-A_2$, $A-A_3 \ldots A-A_N$ and incrementally provides a 4 bit binary word Y representative of the difference value to the comparator circuit 72. When the 4 bit difference word Y is equal to a 4 bit threshold word X, as set by thumb wheel switch 70, comparator 72 will provide a trigger pulse which is applied to the clock input C of flip flop 90. This causes the output of flip flop 90 to change state and energize a relay driver 100 and which, in turn, energizes relay 44.

Once relay 44 is energized its contacts 46 close to in turn energize solenoid 30, causing door 18 to open, thereby dumping the contents of work chamber 12. When the batch is dumped from the chamber 12, the power required to drive blades 20 will decrease and the output voltage from amplifier 62 will decrease below the threshold level set by potentiometer 76. This causes the comparator amplifier 74 to change state whereupon one shot circuit 74 resets the one shot circuit 78 and also resets flip flop 90. When this occurs the output of flip flop 90 changes state tending to deenergize relay 44. However, this relay is a time delayed relay and remains latched for approximately 30 seconds after the flip flop 90 has been reset. This maintains solenoid 30 energized for 30 seconds to assure that all of the contents are dumped from the work chamber 12. Thereafter, spring 34 operates to close door 18 so that a new cycle may commence.

From the foregoing it is seen that the control circuitry 42 serves to provide automatic batch dumping operation, eliminating manual operator dependent control or the use of recording charts and the like. During each cycle a determination is made as to whether the power being consumed to operate motor 24 increases beyond some level, such as 10 percent of full scale, and then an adjustable time period, such as two minutes, is allocated before the circuitry operates to determine whether the power being consumed starts to decrease indicative that the mixture is drying. Once a decreasing power consumption is determined by subtractor 96 in the present embodiment, the decreasing difference is effectively counted and when the difference obtains a threshold level, as set by switch 70, a decision is made to terminate the work cycle by automatically energizing solenoid 30 to open door 18.

Although the invention has been disclosed in conjunction with a preferred embodiment, it is apparent that various modifications and arrangements of parts may be made without departing from the spirit and the scope of the present invention as defined by the dependent claims.

What is claimed is:

1. Apparatus for use with a fluidizing mixer having means for mechanically working material and electrically energized drive means for driving said working means such that electrical energy is expended as work is performed on said material, means for sensing the electrical energy expended as work is performed during a work cycle of operation on said material and providing an electrical energy signal having a value in accordance therewith, and means for terminating a said work cycle of operation when the amount of energy expended to work said material decreases by a given amount.

2. Apparatus as set forth in claim 1 wherein said terminating means includes means for at successive given increments of time determining whether the electrical energy expended has decreased in value by said given amount.

3. Apparatus as set forth in claim 1 wherein said terminating means include electrical energy increment selection means for providing a threshold level signal, and comparator means for periodically determining whether said energy signal has decreased by an amount corresponding with that represented by said threshold signal.

4. Apparatus as set forth in claim 1 wherein said terminating means includes a clock source for providing clock pulses at successive given increments of time, means for successively sampling the value of said energy signal at given increments of time in synchronism with said clock pulses, means for comparing the values of successive said sampled energy signals and providing a control signal when a first said energy signal is greater in value than the next succeeding energy signal.

5. Apparatus as set forth in claim 4 including means responsive to a said control signal for retaining the value of said first energy signal, said comparing means successively comparing said first energy signal with successive said sampled energy signals until the difference from said first energy signal attains a level corresponding with said given amount.

6. Apparatus as set forth in claim 5 including means for providing a terminating signal when said difference attains a level corresponding with said given amount, and means responsive to said terminating signal for terminating a said work cycle.

7. Apparatus as set forth in claim 6 wherein said mixer includes electrically operable work material discharge means responsive to said terminating signal for discharging material from said mixer.

8. Apparatus as set forth in claim 4 including manually adjustable means for providing a threshold signal corresponding with said given amount.

9. Apparatus as set forth in claim 8 wherein said comparing means provides a difference signal having a value which varies with the difference between said first signal and successive sampled energy signals, and means for comparing said difference signal with said threshold signal and providing a said cycle terminating signal when said difference signal attains a value corresponding with said threshold signal.

10. Apparatus as set forth in claim 1 including detector means responsive to said energy signal for providing a first signal so long as the value of said energy signal is greater than a given reference level, means responsive to said first signal for initially timing a given period of time and then providing a clock enabling signal, a source of clock pulses, gating means responsive to said clock enabling signal for passing said clock pulses, means responsive to said passed clock pulses for successively sampling the value of said energy signal until a first said energy signal sample exceeds an immediately succeeding energy signal sample and providing a control signal in accordance therewith.

11. Apparatus as set forth in claim 10 including means responsive to said control signal for retaining the value of a said first energy signal sample, means for comparing said first energy signal, sample with said successive energy signal samples and providing a difference signal having a value in accordance with the difference between a said successive energy signal sample and said first energy signal sample, and means for comparing said difference signal with a threshold level and providing a cycle terminating signal in accordance with the comparison.

12. Apparatus as set forth in claim 11 including manually adjustable means for providing a threshold signal having a value in accordance with a selected threshold level representative of a given decrease in the value of said energy signal, said comparator means having means for receiving said threshold signal and said difference signal and providing a said terminating signal when said difference signal attains a value corresponding with said threshold signal.

13. Apparatus for controlling a mixer having means for mechanically working material and electrically energized drive means for driving said working means such that electrical energy is expended as work is performed on said material, means for sensing the amount of electrical energy expended during a work cycle of operation on said material and providing electrical analog energy signal having a magnitude in accordance therewith, means for determining whether said analog energy signal has attained a magnitude corresponding with at least a first level and providing a first signal in accordance therewith, timing means responsive to said first signal for timing a fixed period of time and then providing a gate enabling signal, a source of clock pulses, analog to digital converter means for receiving said energy signal and converting said analog energy signal into a multibit binary signal at a rate synchronized with said clock pulses so as to incrementally provide a multibit binary signal representative of a sampled value of said analog energy signal, a multibit shift register responsive to a shift signal for receiving and storing the binary signal provided by said analog to digital converter means, gating means responsive to said enabling signal for passing clock pulses for serving as said shift signals to actuate said register means, binary subtractor means for comparing a first binary signal stored in said register means with a second binary signal presently provided by said analog to digital converter means and providing a control signal when said first binary signal exceeds an immediately succeeding said second binary signal, means responsive to said control signal for disabling said gating means to prevent further shift pulses from being supplied to said register means so that said register means continues to store the said first binary bit signal while said converter means continues to provide successive second binary signals in synchronism with said clock source, manually adjustable means for providing a multibit threshold signal representative of a threshold value of decreased power consumption for terminating a said work cycle, said subtractor means providing a binary difference signal as the multibit binary signal from said converter means continues to change so that said difference signal represents the difference between a said first binary signal and a successive said second binary signal, means for comparing said threshold signal with said difference signal and providing a cycle terminating signal when said difference signal attains a value corresponding with said threshold signal, and means responsive to said terminating signal to initiate termination of said work cycle of operation.

* * * * *